US012789167B2

(12) United States Patent
Yang et al.

(10) Patent No.: US 12,789,167 B2

(45) Date of Patent: Nov. 10, 2026

(54) ADSORBENT AND USE THEREOF

(71) Applicant: DALIAN INSTITUTE OF CHEMICAL PHYSICS, CHINESE ACADEMY OF SCIENCES, Dalian (CN)

(72) Inventors: Liping Yang, Dalian (CN); Jiacheng Xing, Dalian (CN); Danhua Yuan, Dalian (CN); Yunpeng Xu, Dalian (CN); Zhongmin Liu, Dalian (CN)

(73) Assignee: DALIAN INSTITUTE OF CHEMICAL PHYSICS, CHINESE ACADEMY OF SCIENCES, Dalian (CN)

(*) Notice: Subject to any disclaimer, the term of this patent is extended or adjusted under 35 U.S.C. 154(b) by 873 days.

(21) Appl. No.: 18/025,652

(22) PCT Filed: Sep. 11, 2020

(86) PCT No.: PCT/CN2020/114898

§ 371 (c)(1),
(2) Date: Mar. 10, 2023

(87) PCT Pub. No.: WO2022/052069

PCT Pub. Date: Mar. 17, 2022

(65) Prior Publication Data

US 2023/0338923 A1 Oct. 26, 2023

(51) Int. Cl.
*B01J 20/22* (2006.01)
*B01D 15/18* (2006.01)
(Continued)

(52) U.S. Cl.
CPC .......... *B01J 20/226* (2013.01); *B01D 15/185* (2013.01); *B01D 15/206* (2013.01);
(Continued)

(58) Field of Classification Search
CPC ................ B01J 20/226; B01J 20/28004; B01J 20/28019; B01J 20/28061; B01D 15/185; B01D 15/426
(Continued)

(56) References Cited

U.S. PATENT DOCUMENTS

2012/0085235 A1* 4/2012 De Weireld ............ B01J 20/226 95/135
2017/0333869 A1* 11/2017 Rosseinsky .......... B01J 20/3085
2018/0215684 A1* 8/2018 Rungta ................. C07C 5/2732

FOREIGN PATENT DOCUMENTS

CN 110961079 A 4/2020
CN 111186842 A 5/2020

OTHER PUBLICATIONS

Mariana A. Moreira, et al., Toward Understanding the Influence of Ethylbenzene in p-Xylene Selectivity of the Porous Titanium Amino Terephthalate MIL-125(Ti): Adsorption Equilibrium and Separation of Xylene Isomers, Langmuir, 2012, pp. 3494-3502, vol. 28, No. 7.
(Continued)

*Primary Examiner* — Anthony J Zimmer
*Assistant Examiner* — Annette Phan
(74) *Attorney, Agent, or Firm* — Bayramoglu Law Offices LLC

(57) ABSTRACT

An adsorbent and a use thereof are provided. The adsorbent is a metal-organic framework (MOF) MIL-125; the MOF MIL-125 has an external specific surface area (SSA) of 160 $m^2/g$ to 220 $m^2/g$; and the MOF MIL-125 includes a micropore with an area of 1,000 $m^2/g$ to 1,500 $m^2/g$. The external SSA of the MOF MIL-125 is much higher than an external SSA of the traditional MIL-125, which has promising application prospects in the adsorptive separation of xylene isomers and exhibits high selectivity for p-xylene.

16 Claims, 4 Drawing Sheets

(51) Int. Cl.
*B01D 15/20* (2006.01)
*B01D 15/42* (2006.01)
*B01J 20/28* (2006.01)

(52) U.S. Cl.
CPC ...... *B01D 15/426* (2013.01); *B01J 20/28004* (2013.01); *B01J 20/28019* (2013.01); *B01J 20/28061* (2013.01); *B01J 20/28066* (2013.01); *B01J 20/2808* (2013.01); *B01J 2220/58* (2013.01)

(58) Field of Classification Search
USPC .......................................................... 502/401
See application file for complete search history.

(56) References Cited

OTHER PUBLICATIONS

Frederik Vermoortele, et al., p-Xylene-Selective Metal-Organic Frameworks: A Case of Topology-Directed Selectivity, Journal of the American Chemical Society, 2011, pp. 18526-18529, vol. 133, No. 46.

Huang Yang, Morphology-Controlled Syntheses of Ti-based Metal-organic Frameworks and Their Catalytic Properties, A Dissertation Submitted for the Degree of Master, 2020, pp. 1-56.

* cited by examiner

ADSORBENT AND USE THEREOF

CROSS REFERENCE TO THE RELATED APPLICATIONS

This application is the national phase entry of International Application No. PCT/CN2020/114898, filed on Sep. 11, 2020, the entire contents of which are incorporated herein by reference.

TECHNICAL FIELD

The present application relates to an adsorbent and a use thereof and belongs to the technical field of adsorption.

BACKGROUND

In recent years, the polyester industry in China has developed rapidly, and the consumption of aromatics (benzene, toluene, and xylene) that are raw materials for producing polyesters has risen rapidly, such that a supply gap of aromatics is increasing year by year. Industrially, a mixture of xylene isomers is mainly derived from catalytic reforming, steam cracking, toluene disproportionation, and coal tar. p-Xylene is the most valuable monomer for industrial applications and can be used in the further production of various polyester products, such as polyethylene terephthalate (PET) and polybutylene terephthalate (PBT). At present, the development and design of adsorbents for the adsorptive separation of xylene isomers is a very hot trend, and the attention of researchers has also shifted from zeolite molecular sieves (ZMSs) used in traditional industry to metal-organic frameworks (MOFs).

The MOF MIL-125 is a typical titanium-containing MOF, is the first titanium-doped carboxylic acid complex with a crystal structure and a pore structure, and is widely used in photocatalytic oxidation and adsorptive separation. At present, there are great difficulties in the synthesis of the MOF MIL-125, because a titanium source is easily hydrolyzed and the hydrolysis rate thereof during synthesis is difficult to control. Therefore, in the current synthesis methods, it is necessary to strictly remove water during a synthesis process, and most operations need to be conducted in a glove box, which seriously affects the application and industrial scale-up of the MOF MIL-125.

SUMMARY

In an aspect of the present disclosure, an adsorbent is provided, and the adsorbent is an MOF MIL-125. The MOF MIL-125 has an external specific surface area (SSA) of 160 $m^2/g$ to 220 $m^2/g$, which has promising application prospects in the adsorptive separation of xylene isomers and exhibits high selectivity for p-xylene.

According to a first aspect of the present application, an adsorbent is provided, where the adsorbent is an MOF MIL-125;

the MOF MIL-125 has an external SSA of 160 $m^2/g$ to 220 $m^2/g$; and the MOF MIL-125 includes a micropore with an area of 1,000 $m^2/g$ to 1,500 $m^2/g$.

Optionally, the MOF MIL-125 includes a micropore with an SSA of 1,200 $m^2/g$ to 1,300 $m^2/g$.

The MOF MIL-125 in the present application includes a large number of microporous structures.

Optionally, a mass content of particles with a particle size of 1.6 μm to 1.8 μm in the MOF MIL-125 of the present application is 85% to 95%.

Optionally, the micropore has a pore size of 0.35 nm to 0.5 nm.

The MOF MIL-125 in the present application is a round cake-like crystal.

Specifically, the external SSA of the MOF MIL-125 provided in the present application is as high as 160 $m^2/g$ to 220 $m^2/g$ and is much larger than an external SSA (91 $m^2/g$ to 98 $m^3/g$) of the traditional MOF MIL-125, and the MOF MIL-125 exhibits a prominent adsorption effect when used as an adsorbent.

Specifically, the MOF MIL-125 in the present application has a regular morphology, a uniform size, and a round cake shape, while the traditional MOF MIL-125 has a defective surface and an extremely uneven particle size distribution.

Optionally, the microporous MOF MIL-125 has a large micropore area.

Optionally, the MOF MIL-125 has a particle size of 0.8 μm to 1 μm.

A preparation method of the MOF MIL-125 in the present application is provided, including preparing the MOF MIL-125 with a titanium-ester polymer as a titanium source.

In particular, the titanium-ester polymer in the present application is obtained by linking a titanium source to a same polymer.

Optionally, the preparation method includes: subjecting a mixture of the titanium-ester polymer, an organic ligand, and an organic solvent to crystallization to obtain the MOF MIL-125, where the organic ligand is terephthalic acid; and the crystallization refers to hydrothermal crystallization.

Specifically, the present application provides a titanium source insoluble in water, that is, the titanium-ester polymer is insoluble in water. Therefore, in a process of synthesizing the MOF MIL-125, there is no need for strict water removal, and there will be no precipitation of titanium dioxide, such that the mass production of the MOF MIL-125 can be realized, which is suitable for industrial applications. In addition, the synthesized MOF MIL-125 has a microporous structure, which has promising application prospects in the adsorptive separation of xylene isomers and exhibits high selectivity for p-xylene.

Optionally, the preparation method of the MOF MIL-125 in the present application includes:

a) thoroughly mixing a titanate and a polyol, introducing nitrogen for protection, and subjecting a resulting mixture to a transesterification reaction for 2 h to 10 h at 80° C. to 180° C. under stirring;

b) subjecting a reaction system obtained in step a) to vacuum distillation for 0.5 h to 5 h at a vacuum degree of 0.01 KPa to 5 KPa and a temperature of 170° C. to 230° C. to obtain the titanium-ester polymer;

c) mixing the titanium-ester polymer obtained in step b) with the terephthalic acid and the organic solvent, and stirring a resulting mixture for 0 h to 100 h at a temperature not higher than 120° C. to obtain a gel mixture; and d) heating the gel mixture obtained in step c) under closed conditions to 100° C. to 200° C., and conducting crystallization for 0 d to 30 d at an autogenous pressure to obtain the microporous MOF MIL-125.

Optionally, the crystallization is conducted in a dynamic or static state.

Optionally, after the crystallization is completed, a solid product is separated, washed until neutral, and dried to obtain the MOF MIL-125.

Optionally, the titanium-ester polymer is obtained by subjecting a raw material including a titanate and a polyol to a transesterification reaction.

Optionally, the transesterification reaction is conducted under stirring.

Optionally, the transesterification reaction is conducted for 2 h to 10 h at 80° C. to 180° C. in an inert atmosphere.

Optionally, the transesterification reaction is conducted for 2 h to 10 h at 80° C. to 180° C. under nitrogen protection.

Optionally, the transesterification reaction is conducted for 2 h to 10 h at 100° C. to 160° C. in an inert atmosphere.

Optionally, the inert atmosphere includes at least one selected from the group consisting of nitrogen and an inert gas.

Optionally, a conversion rate of the transesterification reaction is 60% to 80%.

Optionally, a conversion rate of the transesterification reaction is not greater than 90%.

Optionally, the transesterification reaction further includes vacuum distillation.

Optionally, the vacuum distillation is conducted for 0.5 h to 5 h at a temperature of 170° C. to 230° C. and a vacuum degree of 0.01 KPa to 5 KPa.

Optionally, the vacuum degree is 0.05 Kpa to 3 Kpa.

Optionally, a molar ratio of the titanate to the polyol meets the following condition:

$$\text{titanate:polyol}=(0.5\text{-}5)x:4$$

where x represents a mole number of hydroxyl in each mole of the polyol; and a mole number of each of the above substances refers to a mole number of the substance itself.

Optionally, a molar ratio of the titanate to the polyol meets the following condition:

$$\text{titanate:polyol}=(0.8\text{-}1.2)x:4$$

where x represents a mole number of hydroxyl in each mole of the polyol; and a mole number of each of the above substances refers to a mole number of the substance itself.

Optionally, the titanate is at least one selected from the group consisting of compounds with a chemical formula shown in formula II:

formula II

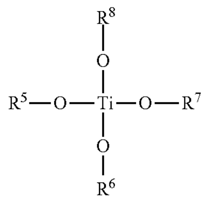

where $R^5$, $R^6$, $R^7$, and $R^8$ each are independently selected from the group consisting of $C_1$-$C_{10}$ alkyl groups.

Optionally, $R^5$, $R^6$, $R^7$, and $R^8$ in formula II each are independently selected from the group consisting of $C_1$-$C_4$ alkyl groups.

Optionally, the titanate includes at least one selected from the group consisting of tetraethyl titanate, tetraisopropyl titanate (TIPT), tetrabutyl titanate, tetrahexyl titanate, and tetraisooctyl titanate.

Optionally, the titanate is one or more selected from the group consisting of tetraethyl titanate, TIPT, tetrabutyl titanate, tetrahexyl titanate, and tetraisooctyl titanate.

Optionally, the polyol includes at least one selected from the group consisting of ethylene glycol (EG), diethylene glycol (DEG), triethylene glycol (TEG), tetraethylene glycol, 1,2-propanediol, 1,3-propanediol, 1,4-butanediol, 1,6-hexanediol, polyethylene glycol (PEG) 200, PEG 400, PEG 600, PEG 800, 1,4-cyclohexanediol, 1,4-cyclohexanedimethanol (1,4-CHDM), 1,4-benzenedimethanol, glycerol, trimethylolpropane, pentaerythritol, xylitol, and sorbitol.

Optionally, the polyol has 2 or more hydroxyl groups; and the polyol includes any one or a mixture of two or more selected from the group consisting of EG, DEG, TEG, tetraethylene glycol, 1,2-propanediol, 1,3-propanediol, 1,4-butanediol, 1,6-hexanediol, PEG 200, PEG 400, PEG 600, PEG 800, 1,4-cyclohexanediol, 1,4-CHDM, 1,4-benzenedimethanol, glycerol, trimethylolpropane, pentaerythritol, xylitol, and sorbitol.

Optionally, the titanium-ester polymer includes at least one selected from the group consisting of a titanium-PEG ester polymer, a titanium-EG ester polymer, and a titanium-1,4-benzenedimethanol ester polymer.

Optionally, the crystallization is conducted for no more than 30 d at a temperature of 100° C. to 200° C. and an autogenous pressure under closed conditions.

Preferably, the crystallization is conducted for 1 d to 15 d at a temperature of 120° C. to 180° C. and an autogenous pressure under closed conditions.

Optionally, a molar ratio of the titanium-ester polymer to the organic ligand is (0.85-2):1;

a mole number of the titanium-ester polymer is calculated based on a titanium content in the titanium-ester polymer; and the titanium content in the titanium-ester polymer is calculated based on a mole number of $TiO_2$.

Optionally, the organic solvent is at least one selected from the group consisting of N,N-dimethylformamide (DMF) and methanol.

Optionally, the organic solvent includes DMF and methanol, and a volume ratio of the DMF to the methanol is (6-15):1.

Optionally, the titanium-ester polymer is prepared by subjecting a titanate and a polyol to a transesterification reaction.

As a specific embodiment, the preparation method of the MOF MIL-125 includes:

a') thoroughly mixing a titanate and a polyol in a three-necked flask, connecting the three-necked flask to a distillation device, introducing nitrogen for protection, and subjecting a resulting mixture to a transesterification reaction for 2 h to 10 h at 80° C. to 180° C. under stirring, where a conversion rate of the transesterification reaction is 60% to 80%;

b') connecting the device obtained after the reaction in step a') to a water pump or oil pump, and subjecting a resulting reaction system to vacuum distillation for 0.5 h to 5 h at a vacuum degree of 0.01 KPa to 5 KPa and a temperature of 170° C. to 230° C. to make the transesterification reaction more complete to obtain the titanium-ester polymer, where a conversion rate of the transesterification reaction is greater than 90%;

c') mixing the titanium-ester polymer obtained in step b') with the terephthalic acid and the organic solvent, and stirring a resulting mixture for 0 h to 100 h at a temperature not higher than 120° C. to obtain a gel mixture;

d') placing the gel mixture obtained in step c') in a high-pressure reactor, sealing, heating to 100° C. to 200° C., and conducting crystallization for 0 d to 30 d at an autogenous pressure; and e') after the crystallization is completed, separating a solid product, washing with deionized water until neutral, and drying to obtain the MOF MIL-125.

As a specific embodiment, a preparation method of the titanium-ester polymer includes:

1) thoroughly mixing a titanate and a polyol in a three-necked flask, connecting the three-necked flask to a distillation device, introducing nitrogen for protection, and subjecting a resulting mixture to a transesterification reaction for 2 h to 10 h at 80° C. to 180° C. under stirring, where a conversion rate of the transesterification reaction is 60% to 80%; and 2) connecting the device obtained after the reaction in step 1) to a water pump or oil pump, and subjecting a resulting reaction system to vacuum distillation for 0.5 h to 5 h at a vacuum degree of 0.01 KPa to 5 KPa and a temperature of 170° C. to 230° C. to make the transesterification reaction more complete to obtain the titanium-ester polymer, where a conversion rate of the transesterification reaction is greater than 90%.

The synthesis process of the titanium-containing microporous MOF MIL-125 of the present application includes the following two steps: step 1: subjecting a mixture of a titanate and a polyol to a transesterification reaction, and distilling the generated alcohol out to obtain the titanium-ester polymer; and step 2: subjecting a mixture of the titanium-ester polymer, terephthalic acid, and an organic solvent to hydrothermal crystallization in a reactor to obtain the titanium-containing microporous MOF MIL-125. In this method, a titanium source is linked to a same polymer to obtain the titanium-ester polymer, which can avoid the rapid hydrolysis of the titanium source, prevent the precipitation of $TiO_2$, involves a simple synthesis process, and does not require the operation in a glove box and the water removal during the traditional synthesis process. In addition, the MOF MIL-125 synthesized by this method has a large number of microporous structures, and thus exhibits high catalytic activity in oxidation.

Optionally, the titanium-containing microporous MOF MIL-125 prepared according to the method described above is used for selective oxidation of an organic matter including $H_2O_2$ and tert-butyl hydroperoxide.

According to a second aspect of the present application, a method for the adsorptive separation of xylene isomers is provided, including using the adsorbent described above to conduct the adsorptive separation of the xylene isomers.

Optionally, the xylene isomers are at least two selected from the group consisting of ethylbenzene, p-xylene, m-xylene, and o-xylene.

Optionally, the adsorbent is used after activation; and a method for the activation includes: placing the adsorbent in an inert atmosphere for the activation to obtain an activated adsorbent.

Optionally, the activation is conducted at 150° C. to 200° C. for 3 h to 12 h; and a flow rate of an inert gas in the inert atmosphere is 50 mL/min to 100 mL/min.

Optionally, a mass ratio of any two isomers among the xylene isomers is 1:1 to 10:1.

Optionally, the method includes: loading the adsorbent into a packed column, allowing a feed solution including the xylene isomers to pass through the packed column, and controlling an effusion time of an effluent to separate the xylene isomers.

Optionally, the feed solution including the xylene isomers has a concentration of 0.1 wt % to 1 wt %; and a flow rate of the feed solution to pass through the packed column is 0.2 mL/min to 2 mL/min.

Optionally, the feed solution including the xylene isomers includes a solvent; and the solvent is at least one selected from the group consisting of mesitylene, p-diethylbenzene, triisopropylbenzene (TIPB), cyclooctane, and n-heptane.

Optionally, the method includes: loading the adsorbent into the packed column, rinsing the packed column with a solvent, allowing the feed solution including the xylene isomers to pass through the packed column, and controlling an effusion time of an effluent to separate the xylene isomers.

Optionally, a solvent for preparing the feed solution including the xylene isomers may be selected from the group consisting of alkanes such as n-hexane, n-heptane, isooctane, and cyclooctane and aromatic compounds such as p-diethylbenzene, TIPB, and mesitylene.

Optionally, the solvent selected in the present application has a specified interaction with the adsorbent and may enter pores of the adsorbent, but the interaction between the solvent and the adsorbent cannot be stronger than an interaction between the adsorbent and the xylene isomers.

Optionally, the performance of the adsorbent in the present application for adsorptive separation of xylene isomers can be verified by a static adsorption experiment, and in the static adsorption experiment, an adsorption capacity of the adsorbent for each isomer during an adsorption equilibrium can be measured, thereby determining which isomer has a strong interaction with the adsorbent.

Optionally, in the present application, a dynamic breakthrough experiment is conducted to simulate a process of adsorptive separation of xylene isomers during an actual application. If it has been verified in the dynamic breakthrough experiment that the adsorbent exhibits a prominent adsorptive separation effect for xylene isomers, it is enough to prove that the adsorbent has promising application prospects in the adsorptive separation of xylene isomers.

Optionally, a mass ratio of the adsorbent to an adsorbate (xylene isomer) in the static adsorption experiment is 0.2 to 0.7.

Optionally, the static adsorption experiment is conducted for 1 h to 24 h.

Optionally, a flow rate of an elution solvent during the dynamic breakthrough experiment should be 1 mL/min to 5 mL/min, and a feed flow rate of the xylene mixed solution should be 0.2 mL/min to 1 mL/min.

Optionally, a feed concentration of the xylene mixed solution during the dynamic breakthrough experiment is greater than 0.001 wt %.

Optionally, an activation temperature before the adsorbent is subjected to performance evaluation should be lower than a skeleton collapse temperature, and should preferably be 200° C.

Optionally, a solvent for feeding during the dynamic breakthrough experiment and a solvent for rinsing pipes may be selected from the group consisting of alkanes such as n-hexane, n-heptane, isooctane, and cyclooctane and aromatic compounds such as p-diethylbenzene, TIPB, and mesitylene.

In the present application, "$C_1$-$C_{10}$", "$C_1$-$C_4$", or the like refers to a number of carbon atoms in a group.

In the present application, the "alkyl group" is a group obtained by removing any hydrogen atom on an alkane molecule.

In the present application, the external SSA refers to an SSA of a porous substance determined by a t-Plot method during the determination of physical adsorption, that is, a total Brunauer-Emmett-Teller (BET) area of the material minuses an SSA of micropores.

Possible beneficial effects of the present application:

1) The adsorbent provided in the present application is an MOF MIL-125, which has an external SSA as high as 160 $m^2/g$ to 220 $m^2/g$, a large number of microporous structures, and a micropore with an SSA of 1,000 $m^2/g$ to 1,500 $m^2/g$.
2) Compared with the synthesis of traditional MOF materials, the synthesis method of the MIL-125 adsorbent in the present application involves simple operations, has no harsh requirements for the experimental environment and experimental reagents, is easy to implement, and has a promising application prospect in industrial scale-up synthesis.
3) The adsorbent of the present application has great application potential in the adsorptive separation of xylene isomers and exhibits significant preferred selectivity for p-xylene.

DETAILED DESCRIPTION OF THE EMBODIMENTS

Figure 1:
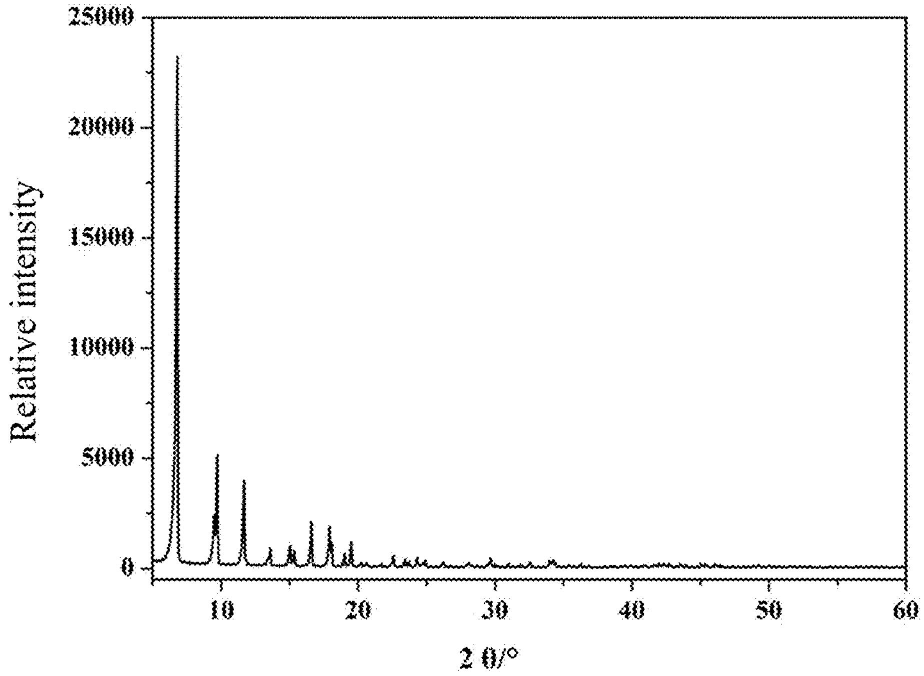
FIG. 1 is an X-ray diffractometry (XRD) pattern of the product synthesized in Example 1 of the present disclosure.

The present application will be described in detail below with reference to examples, but the present application is not limited to these examples.

Unless otherwise specified, the raw materials in the examples of the present application are all purchased from commercial sources.

In the examples of the present application, XRD of a product is conducted by an X'Pert PRO X-ray diffractometer of Netherlandish PANalytical under the following conditions: Cu target, Kα radiation source (λ=0.15418 nm), voltage: 40 KV, and current: 40 mA.

In the examples of the present application, the SEM of a product is conducted by an SU8020 scanning electron microscope of Hitachi.

In the examples of the present application, the physical adsorption and pore distribution of a product are analyzed by an ASAP2020 automatic physical instrument of Micromeritics.

In the examples of the present application, the adsorption performance is evaluated by Agilent gas chromatography (GC) under the following conditions: capillary column: polar PEG stationary phase capillary column, such as FFAP/DB-WAX; front inlet gasification chamber temperature: 150° C. to 200° C.; temperature programming is adopted for the column temperature; detector temperature: 200° C. to 220° C.; carrier gas flow rate: 1 mL/min to 5 mL/min; and $H_2$ flow rate: 10 mL/min to 30 mL/min, and air flow rate: 200 mL/min to 400 mL/min.

In the examples of the present application, a conversion rate of a transesterification reaction is calculated in the following way:

According to a mole number n of alcohol distilled during the reaction, a number of groups participating in the transesterification reaction is determined to be n, and a total mole number of the titanate in the reaction raw material is m, such that the conversion rate of the transesterification reaction is: n/4m.

According to an embodiment of the present application, a preparation method of an MOF MIL-125 includes:

a) a titanate and a polyol are thoroughly mixed in a three-necked flask, the three-necked flask is connected to a distillation device, nitrogen is introduced for protection, and a resulting mixture is subjected to a transesterification reaction for 2 h to 10 h at 80° C. to 180° C. under stirring, where a conversion rate of the transesterification reaction is 60% to 80%;
b) the device obtained after the reaction in step a) is connected to a water pump or oil pump, and a resulting reaction system is subjected to vacuum distillation for 0.5 h to 5 h at a vacuum degree of 0.01 KPa to 5 KPa and a temperature of 170° C. to 230° C. to make the transesterification reaction more complete to obtain the titanium-ester polymer, where a conversion rate of the transesterification reaction is greater than 90%;
c) the titanium-ester polymer obtained in step b) is mixed with the terephthalic acid and the organic solvent, and a resulting mixture is stirred for 0 h to 100 h at a temperature not higher than 120° C. to obtain a gel mixture;
d) the gel mixture obtained in step c) is placed in a high-pressure reactor, the high-pressure reactor is sealed, and the gel mixture is heated to 100° C. to 200° C. and then subjected to crystallization for 0 d to 30 d at an autogenous pressure; and
e) after the crystallization is completed, a solid product is separated, rinsed with an organic solvent, and dried to obtain the microporous MOF MIL-125.

The titanate in step a) is one or more selected from the group consisting of tetraethyl titanate, TIPT, tetrabutyl titanate, tetrahexyl titanate, and tetraisooctyl titanate.

The polyol in step a) has a general formula of $R—(OH)_x$, where x≥2; and the polyol includes any one or a mixture of two or more selected from the group consisting of EG, DEG, TEG, tetraethylene glycol, 1,2-propanediol, 1,3-propanediol, 1,4-butanediol, 1,6-hexanediol, PEG 200, PEG 400, PEG 600, PEG 800, 1,4-cyclohexanediol, 1,4-CHDM, 1,4-benzenedimethanol, glycerol, trimethylolpropane, pentaerythritol, xylitol, and sorbitol.

Preferably, a molar ratio of the titanate to the polyol in step a) is:

$$Ti(OR)_4/R-(\mathrm{OH})_x=(0.8-1.2)x/4$$

Preferably, the reaction in step a) is conducted for 2 h to 10 h at 80° C. to 180° C. under nitrogen protection.

Preferably, a conversion rate of the transesterification reaction in step a) is 65% to 80%.

Preferably, the step b) is conducted under vacuum distillation at a vacuum degree of 0.05 KPa to 3 KPa.

Preferably, the reaction in step b) is conducted at 170° C. to 230° C. for 0.5 h to 5 h.

Preferably, a conversion rate of the transesterification reaction in step b) is greater than 90%.

Preferably, a molar ratio of the terephthalic acid to the titanium-ester polymer in step c) is:

terephthalic acid:titanium-ester polymer=(0.8-2):1, where a mole number of the titanium-ester polymer is calculated based on a titanium content in the titanium-ester polymer; and the titanium content in the titanium-ester polymer is calculated based on a mole number of $TiO_2$.

Preferably, the organic solvent in step c) is a mixture of DMF and methanol, and a volume ratio of the two meets the following condition:

DMF:methanol=(6-15):1.

Preferably, the crystallization in step d) is conducted at 120° C. to 180° C. for 1 d to 15 d.

Preferably, the crystallization in step d) is conducted in a dynamic or static state.

Preferably, the MOF MIL-125 obtained in step e) has a large number of microporous structures and less non-skeleton titanium.

EXAMPLE 1

A specific preparation process was as follows: 5 g of tetraethyl titanate and 10 g of PEG 200 were added to a three-necked flask and thoroughly mixed, the three-necked flask was connected to a distillation device, nitrogen was introduced for protection, and a resulting mixture was subjected to a transesterification reaction for 5 h at 175° C. under stirring, where a conversion rate of the transesterification reaction was 75%; a water pump was connected to the device, and a resulting reaction system was subjected to vacuum distillation for 1 h at a vacuum degree of 3 KPa and a temperature of 200° C. to make the transesterification reaction more complete to obtain a titanium-PEG ester polymer, where a conversion rate of the transesterification reaction was 92%; 6 g of the titanium-PEG ester polymer, 5 g of terephthalic acid, 18 mL of DMF, and 2 mL of methanol were mixed and stirred for 2 h at room temperature, and a resulting mixture was then transferred to a stainless steel high-pressure reactor; the high-pressure reactor was sealed and placed in an oven that had been heated to 120° C., and crystallization was conducted for 2 d at an autogenous pressure; and after the crystallization was completed, a solid product was separated through centrifugation, rinsed with acetone, and dried at 110° C. in air to obtain the microporous MOF MIL-125, which was denoted as A1.

EXAMPLE 2

A specific preparation process was as follows: 5 g of tetraethyl titanate and 3.13 g of EG were added to a three-necked flask and thoroughly mixed, the three-necked flask was connected to a distillation device, nitrogen was introduced for protection, and a resulting mixture was subjected to a transesterification reaction for 5 h at 100° C. under stirring, where a conversion rate of the transesterification reaction was 70%; a water pump was connected to the device, and a resulting reaction system was subjected to vacuum distillation for 1 h at a vacuum degree of 3 KPa and a temperature of 170° C. to make the transesterification reaction more complete to obtain a titanium-EG ester polymer, where a conversion rate of the transesterification reaction was 90%; 3 g of the titanium-EG ester polymer, 2 g of terephthalic acid, 9 mL of DMF, and 1.2 mL of methanol were mixed and stirred for 2 h at room temperature, and a resulting mixture was then transferred to a stainless steel high-pressure reactor; the high-pressure reactor was sealed and placed in an oven that had been heated to 150° C., and crystallization was conducted for 15 d at an autogenous pressure; and after the crystallization was completed, a solid product was separated through centrifugation, rinsed many times with DMF and methanol, and dried at 110° C. in air to obtain the MOF MIL-125, which was denoted as A2.

EXAMPLE 3

A specific preparation process was as follows: 5 g of tetrabutyl titanate and 11.35 g of 1,4-benzenedimethanol were added to a three-necked flask and thoroughly mixed, the three-necked flask was connected to a distillation device, nitrogen was introduced for protection, and a resulting mixture was subjected to a transesterification reaction for 5 h at 160° C. under stirring, where a conversion rate of the transesterification reaction was 80%; a water pump was connected to the device, and a resulting reaction system was subjected to vacuum distillation for 1 h at a vacuum degree of 3 KPa and a temperature of 230° C. to make the transesterification reaction more complete to obtain a titanium-1,4-benzenedimethanol ester polymer, where a conversion rate of the transesterification reaction was 95%; 5 g of the titanium-1,4-benzenedimethanol ester polymer, 3 g of terephthalic acid, 24 mL of DMF, and 3 mL of methanol were mixed and stirred for 2 h at room temperature, and a resulting mixture was then transferred to a stainless steel high-pressure reactor; the high-pressure reactor was sealed and placed in an oven that had been heated to 170° C., and crystallization was conducted for 1 d at an autogenous pressure; and after the crystallization was completed, a solid product was separated through centrifugation, rinsed many times with DMF and methanol, and dried at 110° C. in air to obtain the MOF MIL-125, which was denoted as A3.

EXAMPLE 4

An MOF MIL-125 was prepared by the same method as in Example 1, and specific preparation conditions were different from Example 1 as in Table 1 and Table 2. Samples A4, A5, A6, and A7 were prepared in this example.

TABLE 1

| Condition parameters for the synthesis of a titanium-ester polymer | | | | | | |
|---|---|---|---|---|---|---|
| No. | Titanate, polyol, and a molar ratio thereof | Reaction temperature | Reaction time | Temperature for vacuum distillation | Time for vacuum distillation | Vacuum degree for vacuum distillation |
| 1# | TIPT:glycerol = 2.4:0.6 | 80° C. | 10 h | 180° C. | 3 h | 0.01 KPa |
| 2# | Tetrahexyl titanate:pentaerythritol = 0.75:0.25 | 90° C. | 8 h | 210° C. | 2.5 h | 0.05 KPa |
| 3# | Tetraisooctyl titanate:1,2-propanediol = 0.8:0.2 | 120° C. | 4 h | 170° C. | 5 h | 5 KPa |
| 4# | Tetrahexyl titanate:1,4-cyclohexanediol = 0.7:0.3 | 180° C. | 2 h | 230° C. | 0.5 h | 1.5 KPa |

TABLE 2

| Conditions for synthesis of the MOF MIL-125 | | |
|---|---|---|
| No. | Titanium-ester polymer, terephthalic acid, and a molar ratio thereof; and organic solvents, and a volume ratio thereof | Temperature and time for crystallization |
| A4 | Terephthalic acid:1# = 1:1; and DMF:methanol = 10:1 | 100° C., 30 d |
| A5 | Terephthalic acid:2# = 1:0.9; and DMF:methanol = 12:1 | 120° C., 10 d |
| A6 | Terephthalic acid:3# = 1:0.7; and DMF:methanol = 13:1 | 200° C., 5 d |
| A7 | Terephthalic acid:4# = 1:0.5; and DMF:methanol = 9:1 | 180° C., 8 d |

The crystallization in Examples 1 to 4 was static crystallization.

EXAMPLE 5

A specific preparation process was as follows: 5 g of tetraethyl titanate and 12.5 g of PEG 400 were added to a three-necked flask and thoroughly mixed, the three-necked flask was connected to a distillation device, nitrogen was introduced for protection, and a resulting mixture was subjected to a transesterification reaction for 5 h at 170° C. under stirring, where a conversion rate of the transesterification reaction was 70%; a water pump was connected to the device, and a resulting reaction system was subjected to vacuum distillation for 1 h at a vacuum degree of 3 KPa and a temperature of 200° C. to make the transesterification reaction more complete to obtain a titanium-PEG ester polymer, where a conversion rate of the transesterification reaction was 92%; 6 g of the titanium-PEG ester polymer, 3 g of terephthalic acid, 54 mL of DMF, and 6 mL of methanol were mixed and stirred for 2 h at room temperature, and a resulting mixture was then transferred to a stainless steel high-pressure reactor; the high-pressure reactor was sealed and placed in a rotary oven that had been heated to 150° C. through temperature programming, and crystallization was conducted for 3 d; and after the crystallization was completed, a solid product was separated through centrifugation, rinsed many times with acetone, and dried at 110° C. in air to obtain the microporous MOF MIL-125, which was denoted as A8.

EXAMPLE 6

A specific preparation process was as follows: 5 g of tetraethyl titanate and 8.6 g of 1,4-CHDM were added to a three-necked flask and thoroughly mixed, the three-necked flask was connected to a distillation device, nitrogen was introduced for protection, and a resulting mixture was subjected to a transesterification reaction for 3 h at 200° C. under stirring, where a conversion rate of the transesterification reaction was 75%; an oil pump was connected to the device, and a resulting reaction system was subjected to vacuum distillation for 1 h at 200° C. to make the transesterification reaction more complete to obtain a titanium-CHDM ester polymer, where a conversion rate of the transesterification reaction was 90%; 6.5 g of the titanium-CHDM ester polymer, 2.5 g of terephthalic acid, 45 mL of DMF, and 5 mL of methanol were mixed and stirred for 2 h at room temperature, and a resulting mixture was then transferred to a stainless steel high-pressure reactor; the high-pressure reactor was sealed and placed in a rotary oven that had been heated to 180° C. through temperature programming, and crystallization was conducted for 24 h; and after the crystallization was completed, a solid product was separated through centrifugation, rinsed many times with methanol and DMF, and dried overnight in a vacuum oven to obtain the microporous MOF MIL-125, which was denoted as A9.

EXAMPLE 7

A specific preparation process was as follows: 5 g of tetraethyl titanate and 4 g of 1,3-propanediol were added to a three-necked flask and thoroughly mixed, the three-necked flask was connected to a distillation device, nitrogen was introduced for protection, and a resulting mixture was subjected to a transesterification reaction for 5 h at 165° C. under stirring, where a conversion rate of the transesterification reaction was 75%; a water pump was connected to the device, and a resulting reaction system was subjected to vacuum distillation for 1 h at a vacuum degree of 2 KPa and a temperature of 200° C. to make the transesterification reaction more complete to obtain a titanium-propanediol ester polymer, where a conversion rate of the transesterification reaction was 92%; 3 g of the titanium-propanediol ester polymer, 2 g of terephthalic acid, 36 mL of DMF, and 4 mL of methanol were mixed and stirred for 2 h at room temperature, and a resulting mixture was then transferred to a stainless steel high-pressure reactor; the high-pressure reactor was sealed and placed in a rotary oven that had been heated to 160° C. through temperature programming, and crystallization was conducted for 900 min; and after the crystallization was completed, a solid product was separated through centrifugation, rinsed many times with acetone, and dried at 110° C. in air to obtain the microporous MOF MIL-125, which was denoted as A10.

The crystallization involved in Examples 5 to 7 was dynamic crystallization conducted in a rotary oven with a rotational speed of 40 rpm.

EXAMPLE 8 PHASE STRUCTURE ANALYSIS

The samples A1 to A10 in Examples 1 to 7 each were subjected to XRD analysis, with Example 1 as a typical representative. FIG. 1 is an XRD pattern of the sample A1 synthesized in Example 1, and it can be seen from the figure that the sample A1 is a microporous MOF MIL-125.

Test results of the other samples are only slightly different from the pattern of the sample A1 in Example 1 in the intensity of the diffraction peak, and all of these samples are microporous MOF MIL-125.

EXAMPLE 9 MORPHOLOGY ANALYSIS

Figure 2:
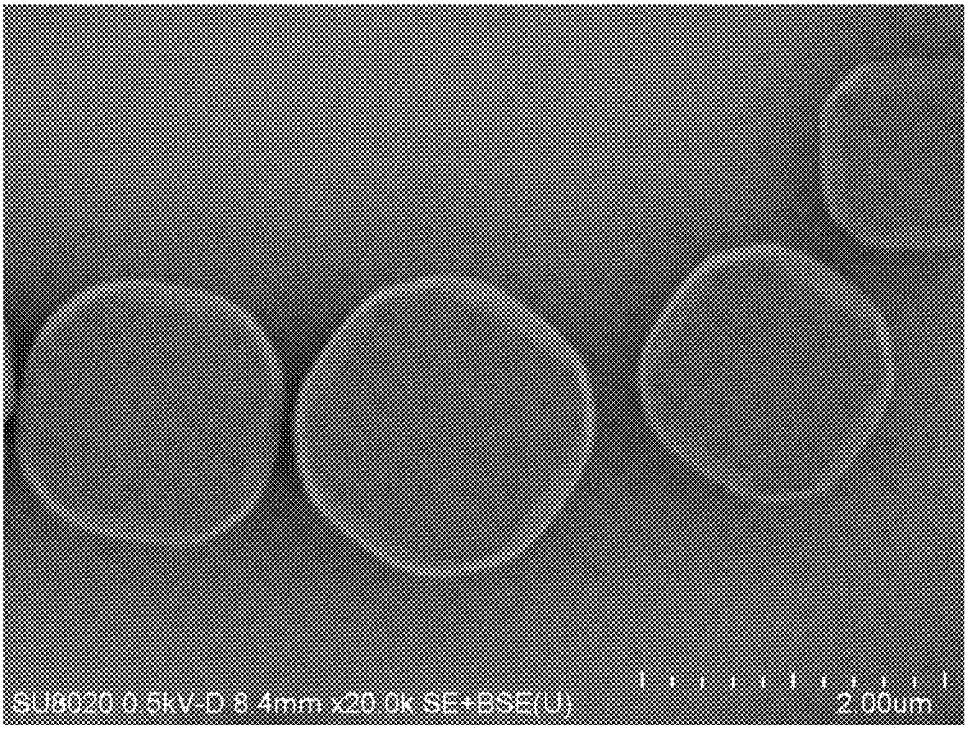
FIG. 2 is a scanning electron microscopy (SEM) image of the product synthesized in Example 1 of the present disclosure.

The samples A1 to A10 in Examples 1 to 7 each were subjected to SEM analysis, with Example 1 as a typical representative. FIG. 2 is an SEM image of the sample A1 synthesized in Example 1, and it can be seen from the figure that the sample A1 has intact MOF MIL-125 grains with a grain size of about 1 μm to 1.5 μm.

The other samples have the same morphology as the sample A1 in Example 1 and have a grain size slightly different from the grain size of the sample A1, and all of these samples are microporous MOF MIL-125.

EXAMPLE 10 LOW-TEMPERATURE NITROGEN PHYSICAL ADSORPTION ANALYSIS

Figure 3:
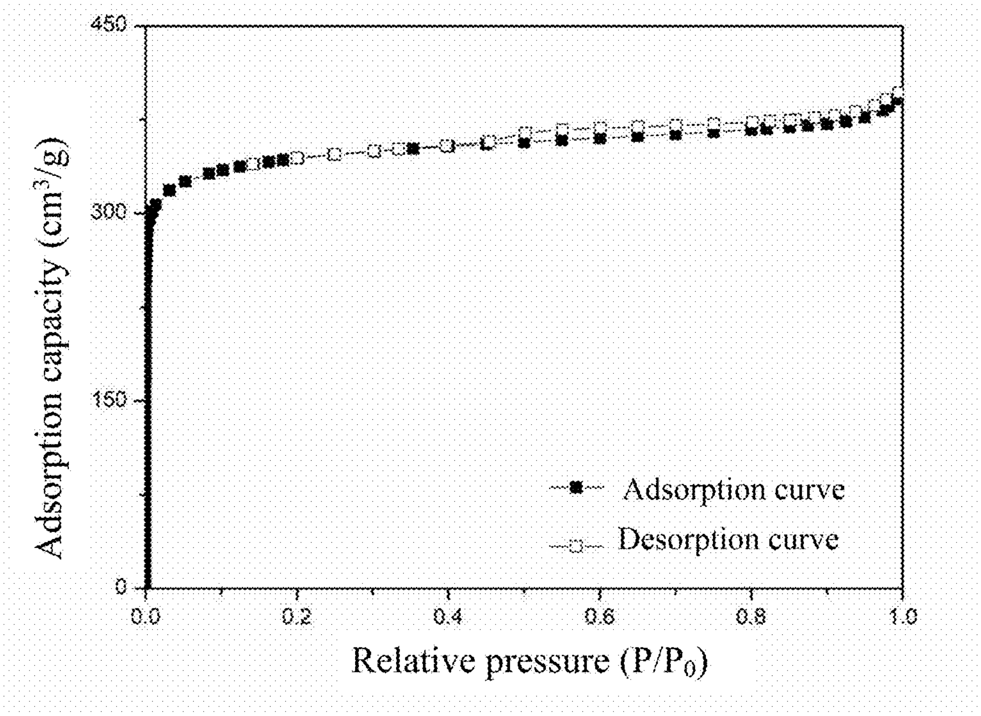
FIG. 3 is a physical adsorption isotherm (BET) of the product synthesized in Example 1 of the present disclosure.

The samples A1 to A10 in Examples 1 to 7 each were subjected to low-temperature nitrogen physical adsorption analysis, with Example 1 as a typical representative. FIG. 3 shows a physical adsorption isotherm of the sample A1 prepared in Example 1, and it can be seen from the figure that the nitrogen adsorption-desorption curve of the sample A1 is a typical type I adsorption isotherm, and the rapid increase in adsorption capacity at a low relative pressure reflects the significant micropore characteristics, indicating that the sample has a microporous structure.

Test results of the other samples are similar to the test results of the sample 1 in Example 1, and an adsorption curve of the sample has obvious micropore characteristics, indicating a typical microporous structure.

EXAMPLE 11 PORE DISTRIBUTION ANALYSIS

The samples A1 to A10 in Examples 1 to 4 each were subjected to physical adsorption and pore distribution analysis, with Example 1 as a typical representative. Table 3 shows the physical adsorption and pore distribution results of the sample A1 prepared in Example 1, and it can be seen from the table that the sample has an SSA of 1,350 $m^2$/g and a micropore size of about 0.4 nm.

TABLE 3

SSA and pore distribution of the sample in Example 1

| Sample | BET SSA/$m^2g^{-1}$ | t-Plot external SSA/$m^2g^{-1}$ | Pore distribution/nm |
|---|---|---|---|
| Example 1 | 1350 | 167 | 0.4 |

Test results of the other samples are similar to the test results of the sample A1 in Example 1, and these samples each have a micropore SSA of 1,000 $m^2$/g to 1,500 $m^2$/g and an external SSA of 160 $m^2$/g to 220 $m^2$/g.

EXAMPLE 12 PARTICLE SIZE ANALYSIS

Figure 4:
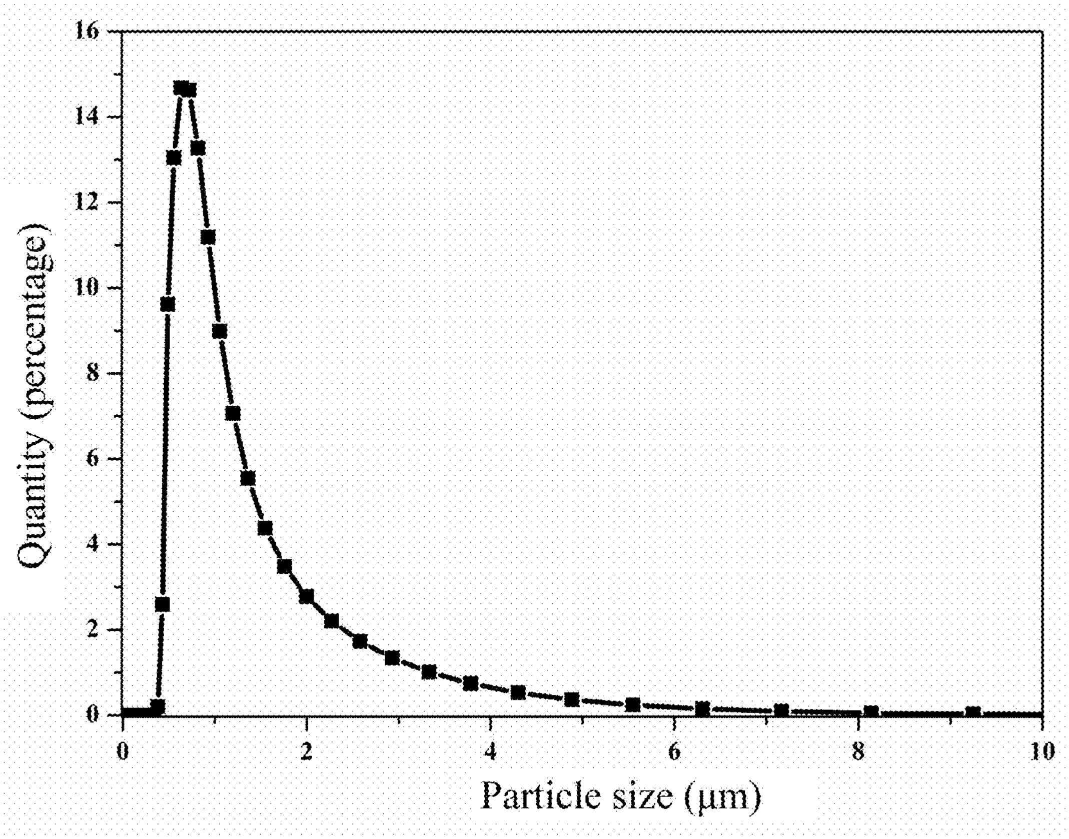
FIG. 4 shows a particle size distribution of the product synthesized in Example 1 of the present disclosure.

The samples A1 to A10 in Examples 1 to 4 each were subjected to particle size analysis, with Example 1 as a typical representative. FIG. 4 shows a particle size distribution of the sample A1 prepared in Example 1, and it can be seen from the figure that the particle size distribution of the sample is mainly concentrated in a range of 1.6 μm to 1.8 μm.

EXAMPLE 13 ADSORBENT PERFORMANCE EVALUATION

A two-component xylene static adsorption experiment and a dynamic breakthrough experiment were conducted on the sample A1 of Example 1.

a) Two-Component Xylene Static Adsorption Experiment

The adsorbent MIL-125 (namely, sample A1) was pretreated with a 200° C. nitrogen gas flow, 0.2 g of the pretreated adsorbent MIL-125 was taken and added to 2 mL of a solution of 2 wt % p-xylene and m-xylene in mesitylene, and an adsorption experiment was conducted in a shaker; a blank control group was set; and 1 h after adsorption, a resulting supernatant was collected and analyzed by GC to determine a concentration of each component in a blank sample and a concentration of each component in an adsorbed sample. The following adsorption data are acquired according to calculation and listed in Table 4, and it can be seen from Table 4 that an adsorption capacity for p-xylene is much greater than an adsorption capacity for m-xylene, indicating that the sample can selectively adsorb p-xylene. According to the adsorption capacity data, the p-xylene/m-xylene selectivity can be further calculated to be 5.84.

TABLE 4

Xylene isomer adsorption capacity data for the sample A1 in Example 1

Figure 5:
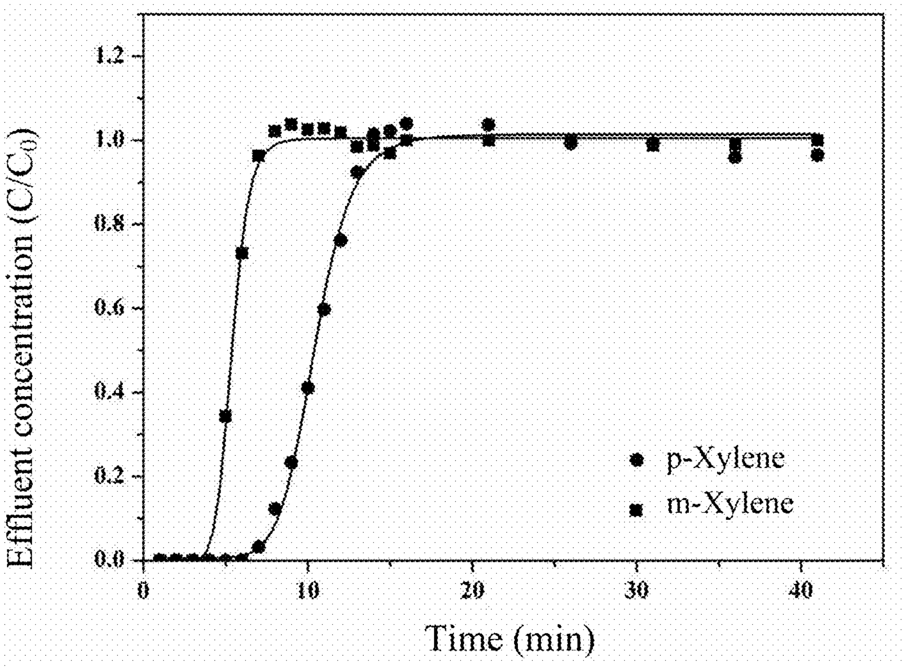
FIG. 5 to FIG. 7 show dynamic breakthrough curves of the samples A1, A2, and A8 for xylene isomers.

| Sample | $Q_{PX}$ (mg/g) | $Q_{MX}$ (mg/g) | $\alpha_{PX/MX}$ |
|---|---|---|---|
| A1 | 45 | 7.71 | 5.84 |

b) Dynamic Breakthrough Experiment 0.6 g of the adsorbent MIL-125 (namely, sample A1) was taken, activated in a 200° C. $N_2$ (100 mL/min) atmosphere for 3 h, and then filled into a stainless steel column; before the start of the breakthrough experiment, pure mesitylene was pumped by a pump at a specified flow rate of 1 mL/min to rinse the pipeline and column; when the pipeline was fully filled with pure mesitylene, the feed solution was changed from mesitylene to a 0.1 wt % two-component xylene mixed solution in a molar ratio of 1:1, and the feed solution was fed at a flow rate of 0.2 mL/min; and starting from the outflow of the first drop of liquid, 11 samples were taken at an interval of 1 min, and then a sample was taken every five minutes until the adsorbent in the column was completely penetrated by the two components xylene. After the experiment was completed, the column was further rinsed with pure mesitylene at a flow rate of 2 mL/min for 2 h. A concentration of the sample was detected by GC, and a curve illustrating a change of the sample concentration over time was plotted and shown in FIG. 5. It can be seen from FIG. 5 that, during the breakthrough experiment, m-xylene is first adsorbed, and after the adsorption saturation is achieved, m-xylene is detected in an effluent, indicating that the adsorption of the sample for m-xylene is weak; and about 5 min later, p-xylene penetrates out, indicating that the sample has a high adsorption capacity and a strong adsorption effect for the p-xylene isomer, which is consistent with the conclusion of the results of the static adsorption experiment.

EXAMPLE 14 ADSORBENT PERFORMANCE EVALUATION

A two-component xylene static adsorption experiment and a dynamic breakthrough experiment were conducted on the sample A2 of Example 2.

a) Two-Component Xylene Static Adsorption Experiment

The adsorbent MIL-125 (namely, sample A2) was pretreated through vacuum-pumping with 200° C. nitrogen, 0.1 g of the pretreated adsorbent MIL-125 was taken and added to 1 mL of a solution of 5 wt % p-xylene and m-xylene in n-heptane, and an adsorption experiment was conducted in a shaker; a blank control group was set; and 12 h after adsorption, a resulting supernatant was collected and analyzed by GC to determine a concentration of each component in a blank sample and a concentration of each component in an adsorbed sample. The following adsorption data were acquired according to calculation and listed in Table 5.

TABLE 5

Xylene isomer adsorption capacity data for the sample A2 in Example 2

Figure 6:
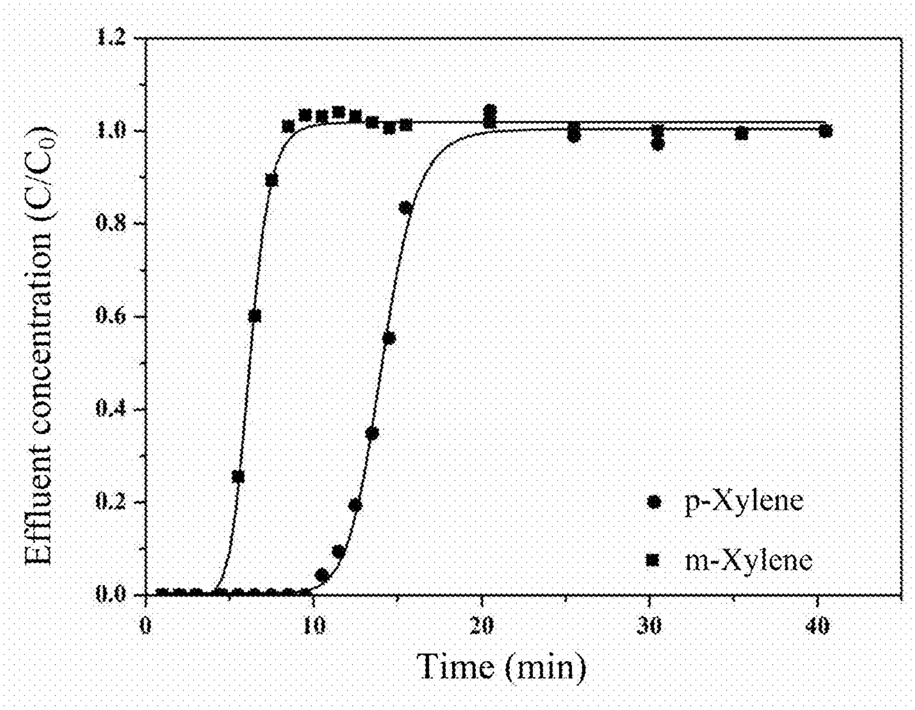

| Sample | $Q_{PX}$ (mg/g) | $Q_{MX}$ (mg/g) | $\alpha_{PX/MX}$ |
|---|---|---|---|
| A2 | 80 | 9.80 | 8.16 |

b) Dynamic Breakthrough Experiment 1 g of the adsorbent MIL-125 was taken, activated in a 200° C. $N_2$ (80 mL/min) atmosphere for 5 h, and then filled into a stainless steel column; before the start of the breakthrough experiment, pure mesitylene was pumped by a pump at a specified flow rate of 2 mL/min to rinse the pipeline and column; when the pipeline was fully filled with pure mesitylene, the feed solution was changed from mesitylene to a 0.3 wt % p-xylene and m-xylene two-component mixed solution in a molar ratio of 1:1, and the feed solution was fed at a flow rate of 0.5 mL/min; and starting from the outflow of the first drop of liquid, 10 samples were taken at an interval of 1 min, and then a sample was taken every five minutes until the adsorbent in the column was completely penetrated by the two components xylene. After the experiment was completed, the column was further rinsed with pure mesitylene at a flow rate of 5 mL/min for 2 h. A concentration of the sample was detected by GC, and a curve illustrating a change of the sample concentration over time was plotted and shown in FIG. 6.

EXAMPLE 15 ADSORBENT PERFORMANCE EVALUATION

A two-component xylene static adsorption experiment and a dynamic breakthrough experiment were conducted on the sample A8 of Example 5.

a) Two-Component Xylene Static Adsorption Experiment

The adsorbent MIL-125 (namely, sample A8) was pretreated through vacuum-pumping with 200° C. nitrogen, 0.5 g of the pretreated adsorbent MIL-125 was taken and added to 5 mL of a solution of 5 wt % p-xylene and m-xylene in TIPB, and an adsorption experiment was conducted in a shaker; a blank control group was set; and 24 h after adsorption, a resulting supernatant was collected and analyzed by GC to determine a concentration of each component in a blank sample and a concentration of each component in an adsorbed sample. The following adsorption data were acquired according to calculation and listed in Table 6.

TABLE 6

Xylene isomer adsorption capacity data for the sample A8 in Example 5

Figure 7:
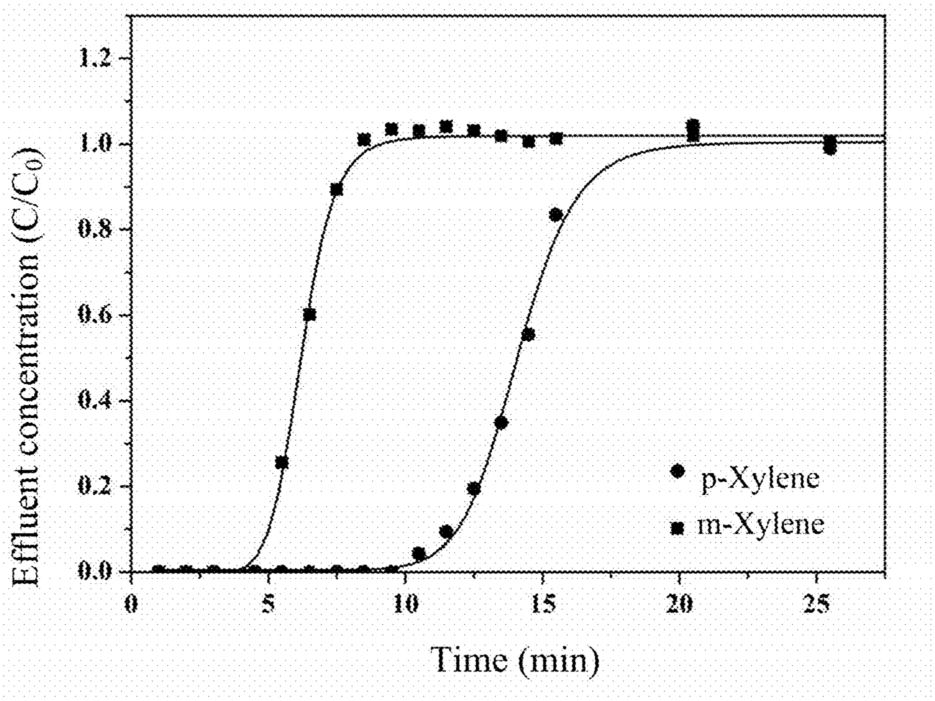

| Sample | $Q_{PX}$ (mg/g) | $Q_{MX}$ (mg/g) | $\alpha_{PX/MX}$ |
|---|---|---|---|
| A8 | 107.70 | 7.70 | 13.60 |

b) Dynamic Breakthrough Experiment 4 g of the adsorbent MIL-125 was taken, activated in a 200° C. $N_2$ (100 mL/min) atmosphere for 3 h, and then filled into a stainless steel column; before the start of the breakthrough experiment, pure mesitylene was pumped by a pump at a specified flow rate of 5 mL/min to rinse the pipeline and column; when the pipeline was fully filled with pure mesitylene, the feed solution was changed from mesitylene to a 0.5 wt % p-xylene and m-xylene two-component mixed solution in a molar ratio of 1:1, and the feed solution was fed at a flow rate of 1 mL/min; and starting from the outflow of the first drop of liquid, 10 samples were taken at an interval of 1 min, and then a sample was taken every five minutes until the adsorbent in the column was completely penetrated by the two components xylene. After the experiment was completed, the column was further rinsed with pure mesitylene at a flow rate of 5 mL/min for 2 h. A concentration of the sample was detected by GC, and a curve illustrating a change of the sample concentration over time was plotted and shown in FIG. 7.

EXAMPLE 16 SINGLE/MULTI-COMPONENT STATIC ADSORPTION EXPERIMENT

The same static adsorption experimental method as in Example 13 was used to evaluate the adsorption performance of the MOF MIL-125, and specific static adsorption experimental conditions were different from that in Examples 13, 14, and 15 as in Tables 7 and 8.

TABLE 7

Condition parameters for a single-component xylene static adsorption experiment

| No. | Xylene composition in an adsorbate | Solvent | Xylene content in an adsorbate | Adsorption time | Mass ratio of adsorbate to adsorbent |
|---|---|---|---|---|---|
| 1# | p-Xylene | Mesitylene | 2 wt % | 3 h | 3:2 |
| 2# | p-Xylene | p-Diethylbenzene | 5 wt % | 2.5 h | 3:1 |
| 3# | p-Xylene | TIPB | 3 wt % | 5 h | 5:1 |

TABLE 7-continued

Condition parameters for a single-component xylene static adsorption experiment

| No. | Xylene composition in an adsorbate | Solvent | Xylene content in an adsorbate | Adsorption time | Mass ratio of adsorbate to adsorbent |
|---|---|---|---|---|---|
| 4# | p-Xylene | Cyclooctane | 5 wt % | 0.5 h | 4:1 |
| 5# | p-Xylene | n-Heptane | 6 wt % | 2 h | 2:1 |

TABLE 8

Condition parameters for a multi-component xylene competitive adsorption experiment

| No. | Xylene composition in an adsorbate | Solvent | Xylene content in an adsorbate | Adsorption time | Mass ratio of adsorbate to adsorbent |
|---|---|---|---|---|---|
| 6# | p-Xylene:m-xylene = 1:1 | Mesitylene | 2 wt % | 3 h | 3:2 |
| 7# | p-Xylene:m-xylene = 1:1 | p-Diethylbenzene | 5 wt % | 2.5 h | 3:1 |
| 8# | p-Xylene:m-xylene = 1:1 | TIPB | 3 wt % | 5 h | 5:1 |
| 9# | p-Xylene:m-xylene = 1:1 | Cyclooctane | 5 wt % | 0.5 h | 4:1 |
| 10# | p-Xylene:m-xylene = 1:1 | n-Heptane | 6 wt % | 2 h | 2:1 |
| 11# | p-Xylene:m-xylene:o-xylene = 1:1:1 | Isooctane | 4 wt % | 1.5 h | 3:2 |

The test results of the above sample are slightly different from the test results of the sample A1 in Example 1 only in adsorption selectivity, and these samples can selectively adsorb p-xylene with adsorption performance far better than the adsorption performance of MIL-125 prepared by the traditional method.

EXAMPLE 17 TWO-COMPONENT XYLENE DYNAMIC BREAKTHROUGH EXPERIMENT

The same dynamic experimental method as in Example 13 was used to evaluate the adsorption performance of the MOF MIL-125, and a specific breakthrough experimental process was different from that in Examples 13, 14, and 15 as in Table 9.

TABLE 9

Condition parameters for the two-component xylene dynamic breakthrough experiment

| No. | Xylene composition in a breakthrough feed solution | Xylene content in a breakthrough feed solution | Solvent |
|---|---|---|---|
| 12# | p-Xylene:m-xylene = 1:1 | 1 wt %, 1 wt % | Mesitylene |
| 13# | p-Xylene:m-xylene = 2:1 | 1 wt %, 0.5 wt % | p-Diethylbenzene |
| 14# | p-Xylene:m-xylene = 5:1 | 1 wt %, 0.2 wt % | TIPB |
| 15# | p-Xylene:m-xylene = 10:1 | 1 wt %, 0.1 wt % | n-Heptane |

The breakthrough results of the above sample are slightly different from the test results of the sample A1 in Example 1 only in adsorption selectivity, which is reflected by a slight difference in breakthrough time; and these samples can selectively adsorb p-xylene with adsorption performance far better than the adsorption performance of MIL-125 prepared by the traditional method.

EXAMPLE 18 COMPARISON OF ADSORPTIVE SEPARATION PERFORMANCE OF THE ADSORBENT OF THE PRESENT APPLICATION WITH A XYLENE ADSORBENT IN THE PRIOR ART

Figure 8:
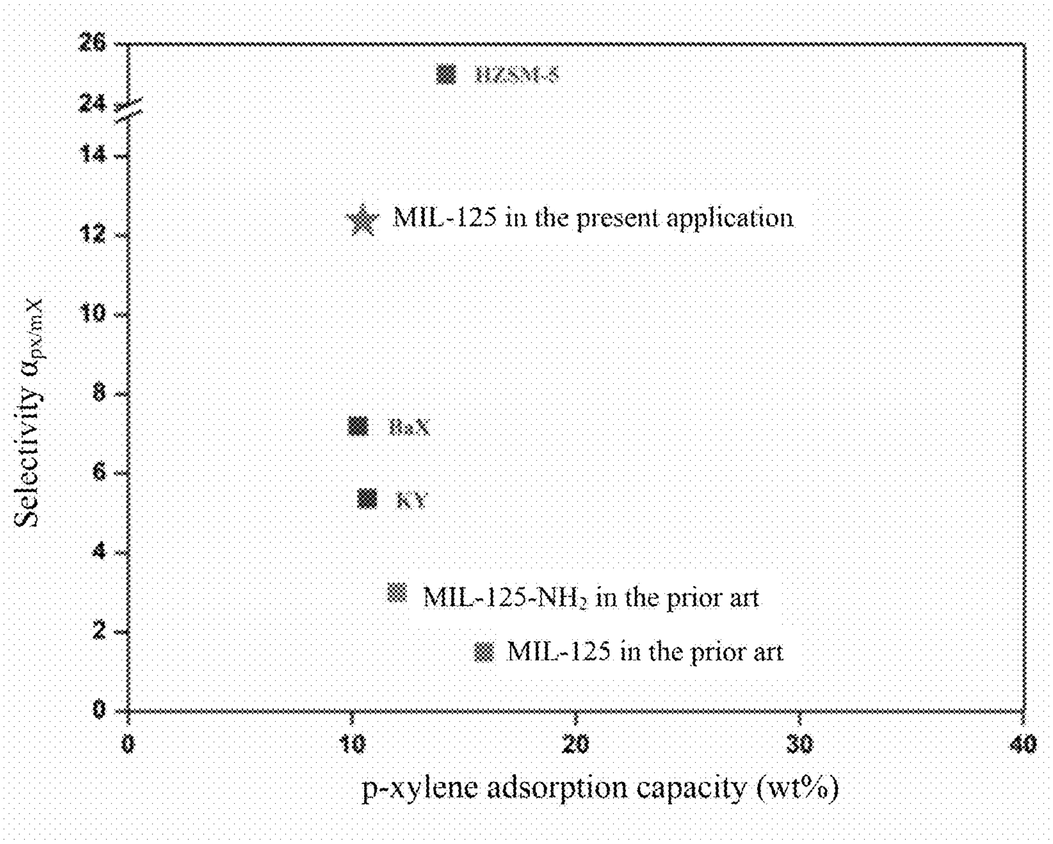
FIG. 8 shows the comparison of the separation performance of the adsorbent of the present application with a xylene adsorbent in the prior art.

According to the existing literature, a molecular sieve adsorbent widely studied and MIL-125 series materials synthesized according to the existing techniques were selected for comparison, and the comparison results of separation performance were shown in FIG. 8. The breakthrough experiments of the MIL-125 series materials synthesized according to the existing techniques show that MIL-125-$NH_2$ (a) has selectivity of 3 for p-xylene/m-xylene and selectivity of 2.2 for p-xylene/o-xylene at 298 K; and MIL-125 (b) has selectivity of 1.5 for p-xylene/m-xylene and selectivity of 1.6 for p-xylene/o-xylene at 313 K. It can be seen from the figure that the selectivity of the MIL-125 material synthesized by the method of the present application is higher than the selectivity of each of MIL-125 and MIL-125-$NH_2$ synthesized by the conventional methods under the experimental conditions of the present application. It can be seen that, compared with the molecular sieve adsorbent widely studied, the MIL-125 material synthesized by the method of the present application exhibits higher selectivity for p-xylene/m-xylene. The HZSM-5 molecular sieve has a high adsorption capacity, but cannot be reused, and p-xylene will be strongly adsorbed on the molecular sieve. Therefore, HZSM-5 cannot be used for separation of p-xylene.

a) M. A. Moreira, J. C. Santos, A. F. P. Ferreira, J. M. Loureiro, F. Ragon, P. Horcajada, P. G. Yot, C. Serre and A. E. Rodrigues, Langmuir 2012, 28, 3494-3502; and b) F. Vermoortele, M. Maes, P. Z. Moghadam, M. J. Lennox, F. Ragon, M. Boulhout, S. Biswas, K. G. M. Laurier, I. Beurroies, R. Denoyel, M. Roeffaers, N. Stock, T. Dueren, C. Serre and D. E. De Vos, Journal of the American Chemical Society 2011, 133, 18526-18529.

The above examples are merely few examples of the present application, and do not limit the present application in any form. Although the present application is disclosed as above with preferred examples, the present application is not limited thereto. Some changes or modifications made by any technical personnel familiar with the profession using the technical content disclosed above without departing from the scope of the technical solutions of the present application are equivalent to equivalent implementation cases and fall within the scope of the technical solutions.

What is claimed is:

1. An adsorbent, comprising a metal-organic framework (MOF) MIL-125, wherein the MOF MIL-125 has an external specific surface area (SSA) of 160 $m^2/g$ to 220 $m^2/g$; and the MOF MIL-125 comprises a micropore with an SSA of 1,000 $m^2/g$ to 1,500 $m^2/g$.

2. The adsorbent according to claim 1, wherein a mass content of particles with a particle size of 1.6 μm to 1.8 μm in the MOF MIL-125 is 85% to 95%.

3. The adsorbent according to claim 1, wherein the MOF MIL-125 is a round crystal.

4. The adsorbent according to claim 1, wherein the micropore has a pore size of 0.35 nm to 0.5 nm.

5. A method for an adsorptive separation of xylene isomers, comprising: using an adsorbent to conduct the adsorptive separation of the xylene isomers, wherein the adsorbent comprises a metal-organic framework (MOF) MIL-125, the MOF MIL-125 has an external specific surface area (SSA) of 160 $m^2/g$ to 220 $m^2/g$, and the MOF MIL-125 comprises a micropore with an SSA of 1,000 $m^2/g$ to 1,500 $m^2/g$.

6. The method according to claim 5, wherein the xylene isomers are at least two selected from the group consisting of p-xylene, m-xylene, and o-xylene.

7. The method according to claim 5, wherein the adsorbent is used after an activation; and a method for the activation comprises: placing the adsorbent in an inert atmosphere for the activation to obtain an activated adsorbent.

8. The method according to claim 7, wherein the activation is conducted at 150° C. to 200° C. for 3 h to 12 h; and a flow rate of an inert gas in the inert atmosphere is 50 mL/min to 100 mL/min.

9. The method according to claim 5, wherein a molar ratio of two isomers among the xylene isomers is 1:1 to 10:1.

10. The method according to claim 5, comprising: loading the adsorbent into a packed column, allowing a feed solution comprising the xylene isomers to pass through the packed column, and controlling an effusion time of an effluent to separate the xylene isomers.

11. The method according to claim 10, wherein the feed solution comprising the xylene isomers has a concentration of 0.1 wt % to 1 wt %; and a flow rate of the feed solution comprising the xylene isomers to pass through the packed column is 0.2 mL/min to 2 mL/min.

12. The method according to claim 10, wherein the feed solution comprising the xylene isomers comprises a first solvent; and the first solvent is at least one selected from the group consisting of mesitylene, p-diethylbenzene, triisopropylbenzene (TIPB), cyclooctane, and n-heptane.

13. The method according to claim 12, comprising: loading the adsorbent into the packed column, rinsing the packed column with a second solvent, allowing the feed solution comprising the xylene isomers to pass through the packed column, and controlling the effusion time of the effluent to separate the xylene isomers.

14. The method according to claim 5, wherein a mass content of particles with a particle size of 1.6 μm to 1.8 μm in the MOF MIL-125 is 85% to 95%.

15. The method according to claim 5, wherein the MOF MIL-125 is a round crystal.

16. The method according to claim 5, wherein the micropore has a pore size of 0.35 nm to 0.5 nm.

* * * * *